April 28, 1925. 1,535,452
P. CONRADSON
GRINDING MACHINE
Filed Feb. 15, 1923   4 Sheets-Sheet 3
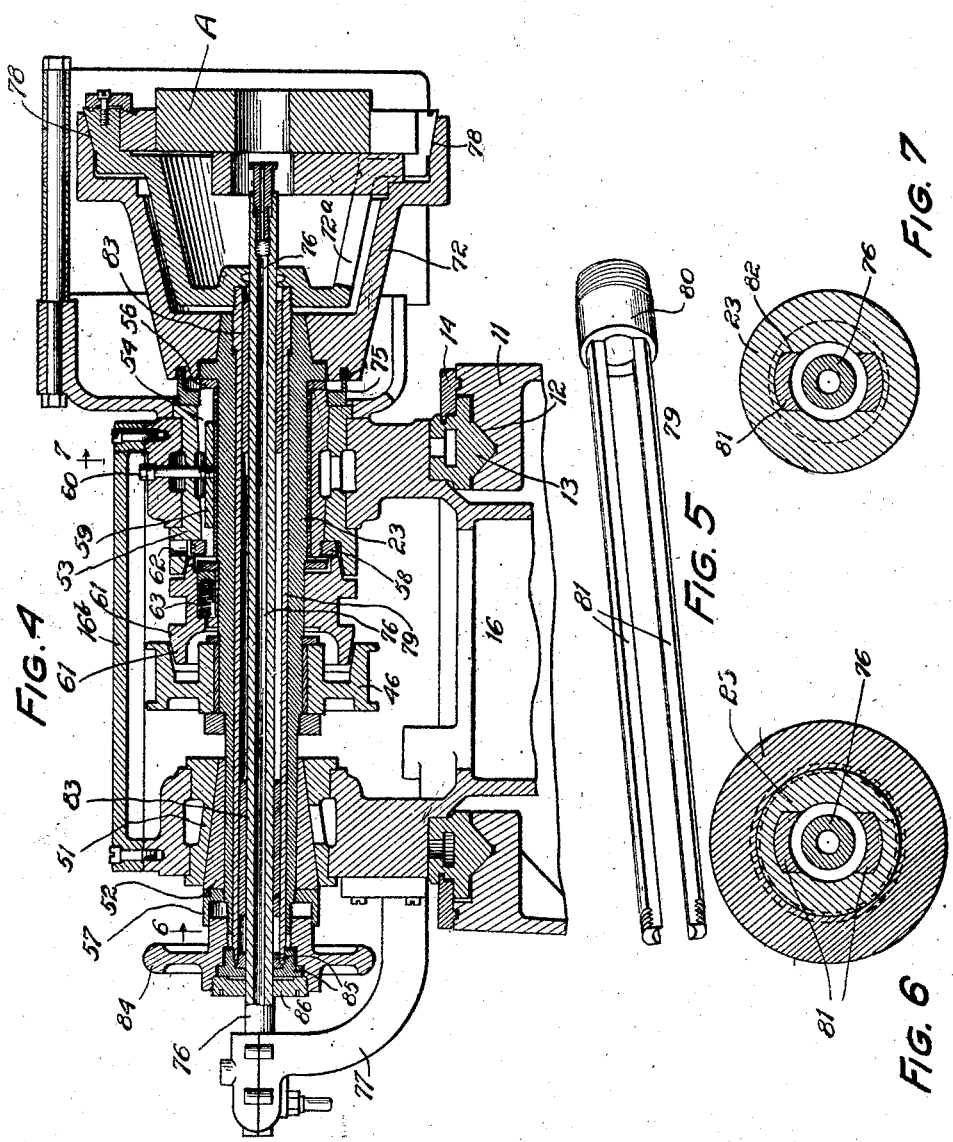
WITNESS:
John E. Titus
INVENTOR
Prentice Conradson
By Lindahl Parker & Carlson
Attys April 28 1925.                          1,535,452
              P. CONRADSON
              GRINDING MACHINE
           Filed Feb. 15, 1923     4 Sheets-Sheet 4
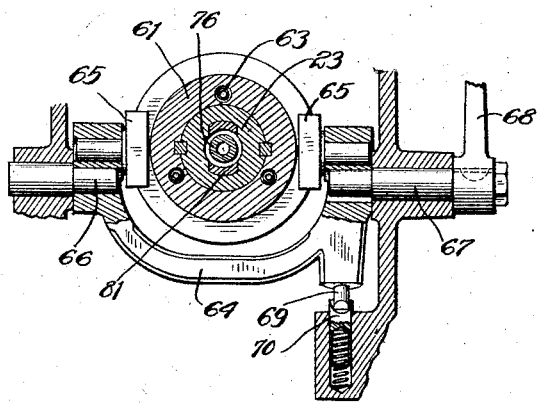
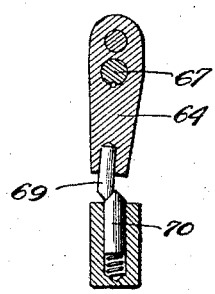
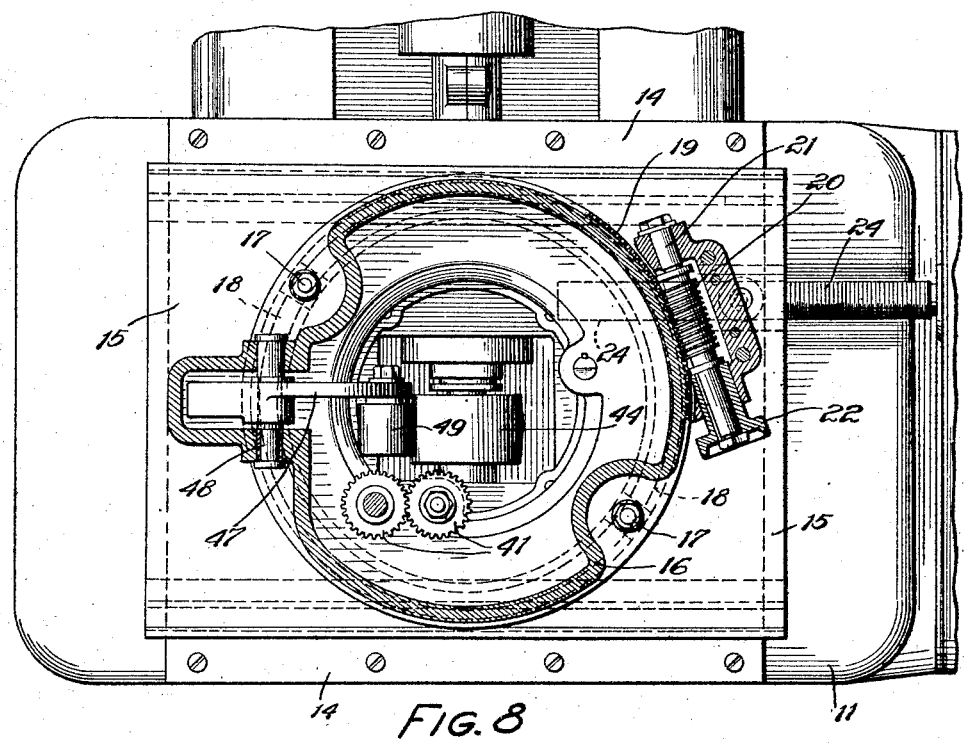
WITNESS:                         INVENTOR
                              Prentice Conradson Patented Apr. 28, 1925.

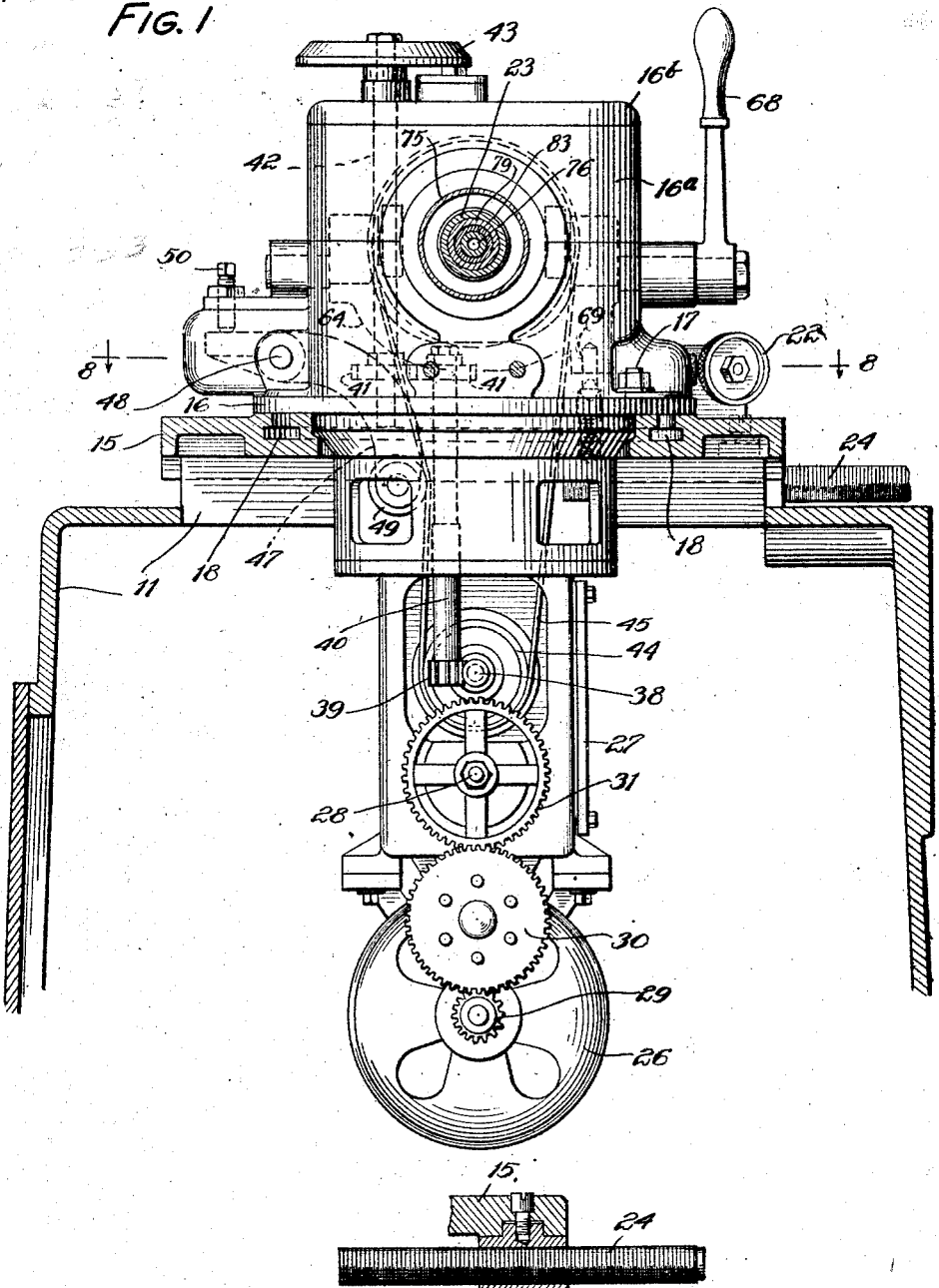

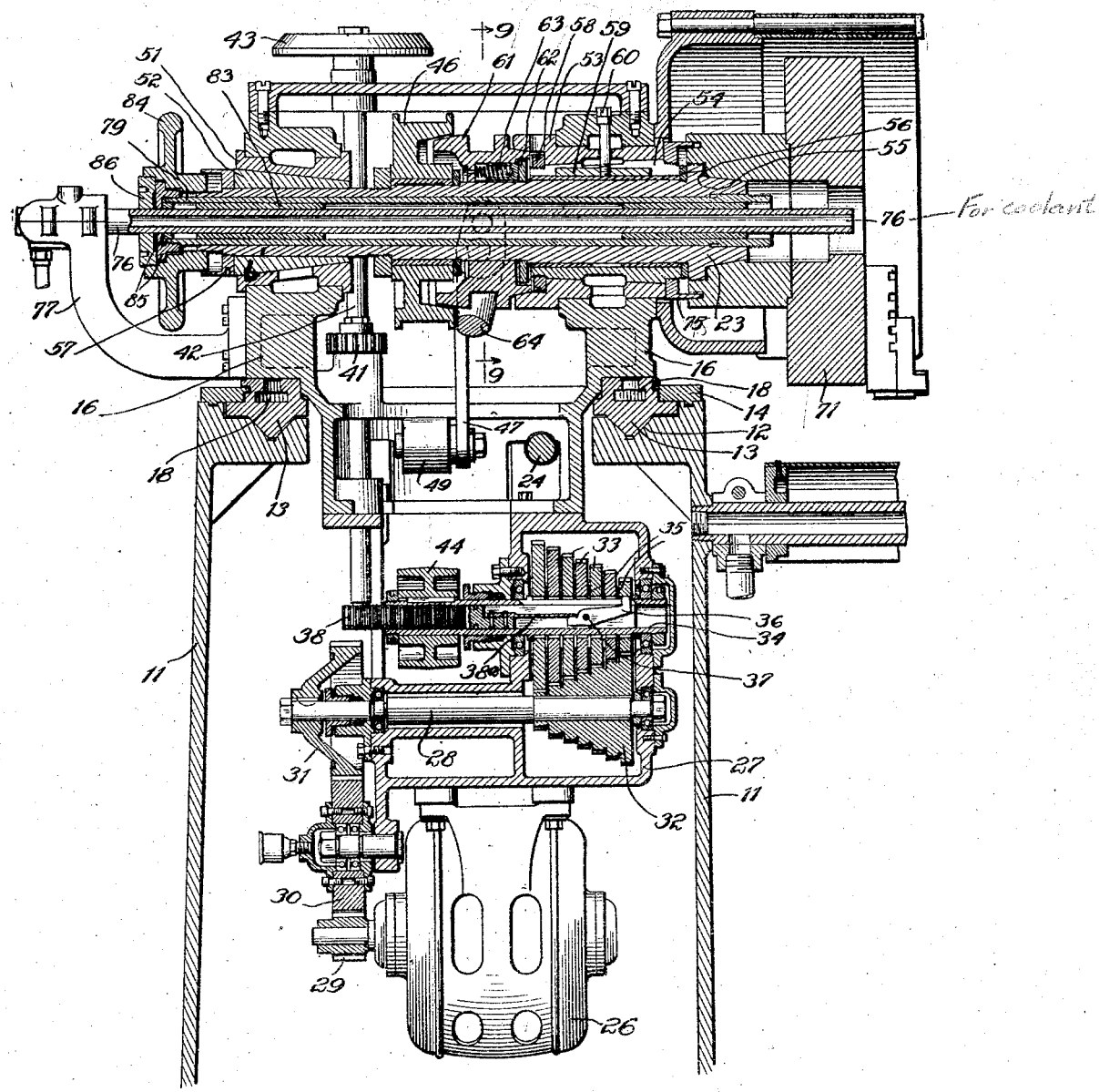

1,535,452

UNITED STATES PATENT OFFICE.

PRENTICE CONRADSON, OF EVANSVILLE, WISCONSIN, ASSIGNOR TO GIDDINGS & LEWIS MACHINE TOOL COMPANY, OF FOND DU LAC, WISCONSIN, A CORPORATION OF WISCONSIN.

GRINDING MACHINE.

Application filed February 15, 1923. Serial No. 619,123.

*To all whom it may concern:*

Be it known that I, PRENTICE CONRADSON, a citizen of the United States, residing at Evansville, in the county of Rock and State of Wisconsin, have invented a certain new and useful Grinding Machine, of which the following is a specification.

This invention relates to a machine tool which is herein shown as a grinding machine of the type more fully disclosed in my copending application Ser. 619,122 filed February 15, 1923 and the invention relates more particularly to improvements in spindle carriages and in the manner of mounting and operating the same.

The general object of the invention is to provide a spindle-carriage having novel and improved means for driving the spindle, for starting and stopping rotation of the spindle, and for adjusting the spindle to different positions about a vertical axis to permit of grinding taper work.

A more specific object is to produce a spindle-carriage comprising two sections, one of which is mounted for sliding movement and the other of which is mounted on the first section for rotation about a vertical axis, and to provide spindle driving means comprising a motor and change-speed gearing mounted directly on the under side of the said rotatable section so as to slide and rotate therewith as a unit.

Another object is to provide manually operable means also mounted on said rotatable section for shifting the said change-speed gearing.

A further object is to provide, in a carriage having a rotational adjustment about a vertical axis, a spindle-driving means comprising a pulley on the spindle, a motor and driving pulley mounted on the under side of said carriage, and a belt running over said pulleys, wherby said motor, belt, and pulleys turn as a unit during such rotational adjustment to avoid twisting of said belt.

Further and ancillary objects and advantages will be made apparent from the following detailed description taken in connection with the accompanying drawings in which Figure 1 is a view showing the major portion of the headstock carriage in elevation, the work-chuck spindle and the base of the machine being sectioned away on a vertical plane extending transversely through the grinding machine.

Fig. 2 is a sectional detail view showing the screw by which the carriage is fed in a direction transversely to its spindle axis.

Fig. 3 is a vertical sectional view through the complete carriage and the base, taken in the plane of the axis of the spindle.

Fig. 4 is a similar view of the upper portion of the carriage showing a modified form of work-chuck.

Fig. 5 is a detail perspective view of the draw bar for operating the chuck.

Figs. 6 and 7 are transverse sectional views through the spindle unit taken in the planes of lines 6 and 7 of Fig. 4.

Fig. 8 is a horizontal section through the carriage taken in plane of line 8—8 of Fig. 1.

Fig. 9 is a sectional view in the plane of line 9—9 of Fig. 3 illustrating the clutch and brake devices for the spindle.

Fig. 10 is a detail view of the dogs for holding the clutch and brake operating lever in position.

While my invention is susceptible of various modifications, I have shown in the drawings and will herein describe in detail the preferred embodiment, but it should be understood that I do not thereby intend to limit the invention to the exact construction disclosed but aim to cover in the subjoined claims all modifications and alternative constructions falling within the scope of the invention.

The machine shown in my copending application above referred to and of which the present headstock forms a part is especially adapted for internal grinding and comprises a bed or base, a carriage mounted to reciprocate longitudinally of the base and having a rotary spindle provided with a grinding wheel, a headstock provided with a spindle having thereon a chuck or fixture for holding the work to be ground, and means for reciprocating the said carriage to move the grinding wheel lengthwise of the bore of the work and for incrementally feeding the headstock in a direction transverse to its spindle axis so as to move the work against the grinding wheel.

In the preferred embodiment of the invention herein disclosed the machine comprises a base 11 of hollow rectangular form, on the upper end of which are parallel grooves or ways 12 (Fig. 3) to receive ribs or guides 13 on the headstock carriage, said ribs being secured against upward displacement by gibs 14 secured to the base 11 and overlying flanges on said ribs 13.

The carriage comprises a rectangular base section 15 and a main body section 16 which extends through a central circular opening in the base section and is rotatably adjustable on a vertical axis being locked to the base section by means of bolts 17, the heads of which engage in an annular T-slot 18 in the base section.

The body section has a worm tooth sector 19 on its external periphery with which meshes a worm 20 carried by the shaft 21 that is mounted in fixed bearings on the base section 15 and is provided with a hand-wheel 22 by which the worm may be turned to effect rotation of the body section of the carriage in relation to the base section. This is for the purpose of varying the position of the work-chuck spindle 23 so as to grind taper work.

The carriage as a whole is arranged to be fed along the ways 12 transversely of the axis of the spindle 23 by means of a feed screw 24 which is rotatably but stationarily mounted on the base 11 of the machine and which passes through a feed nut 25 (Fig. 2) that is carried by the base section 15 of the carriage. It will be understood that the work to be ground is fixed in a chuck on the spindle 23 and that the feed screw 24 acts to move the carriage as a whole and press the work against the grinding wheel (not shown).

The spindle 23 is arranged to be driven by an electric motor 26 through change speed gearing which is mounted in a housing 27 secured to the underside of the body section 16 of the carriage, the motor in turn being secured to the underside of the housing 27, and the motor and gearing being enclosed within the main base 11 of the machine. It will be seen that the motor and change speed gearing move with the carriage in its transverse feed and also are adjustable with the body section 16 of the carriage on its vertical axis. The change speed gearing, in the preferred form herein shown, comprises a shaft 28 which is driven from the armature shaft of the motor by a train of gears 29, 30, 31, said shaft having keyed thereon a cone of spur gears 32. The individual gears of this cone are in constant mesh with complementary gears 33 that are mounted for independent rotation upon a hollow shaft 34 suitably journalled in the housing 27, the gears being spaced apart by spacers 35. A key 36 is pivoted at 37 in a slot in a shaft 38 that fits within the hollow shaft 34, the shaft 38 being slidable lengthwise within the shaft 34 but being non-rotatable with relation thereto. This key has an angular end which passes through a slot in the hollow shaft 34 and is arranged to engage in key grooves in any one of the gears 33, the shaft 38 being longitudinally slidable in the shaft 34 to cause engagement of the key 36 with any desired gear 33. In this longitudinal movement of the shaft 38 the beveled end of the key is carried into engagement with one of the spacers 35 and is thereby caused to withdraw from the key groove in one gear, the key dropping into position to engage the key groove in the adjacent gear after the key has passed the spacer 35.

A leaf spring 38$^a$ which is fixed to the shaft 38 engages one end of the key 36 and tends to hold its angular end in position to engage one of the gears 33.

The end of the shaft 38 opposite to the key 36 has a circular rack formed thereon to mesh with a pinion 39 (Fig. 1) which is fixed on the lower end of a vertical shaft 40, the upper end of the shaft 40 being connected by a pair of pinions 41 with another vertical shaft 42 that projects through the top of the carriage and has an index wheel 43 fixed thereon. By manual rotation of this wheel the shaft 38 may be moved longitudinally within the shaft 34 to engage the key 36 with any desired one of the gears 33 thereby controlling the speed of the shaft 34.

This shaft 34 has keyed thereon a pulley or chain wheel 44 around which runs a belt or silent chain 45 that also runs over a pulley or chain wheel 46 rotatably mounted on the spindle 23. A suitable belt tightener is provided in the form of a lever 47 pivoted between its ends at 48 (Fig. 1) and carrying at its lower end a pulley 49 to bear against the belt or silent chain 45, the opposite end of said lever being engaged by a set screw 50 by which the position of the lever may be adjusted.

The upper part 16$^a$ of the body section of the carriage comprises a separate casting which is separable from the lower part along the horizontal plane of the axis of the spindle 23, the top of the upper section 16$^a$ being closed by a cover plate 16$^b$.

The section 16$^a$ and the subjacent section receive between them the bearings in which the spindle 23 is mounted. These bearings comprise outer stationary sleeves 51, 53, and inner adjustable sleeves 52, 54, the latter being split longitudinally so as to be compressible, and the inner and outer sleeves having complementary conical peripheries so that by moving the inner sleeves longitudinally said sleeves may be compressed to take up wear upon the spindle 23. The spindle has a shoulder 55 near the chuck end and between this shoulder and the inner sleeve 54 is a hardened wear plate or washer 56. On the opposite end of the spindle is threaded a nut 57 which bears against the adjacent inner sleeve 52. Nuts 58 and 75 are threaded respectively on the smaller and larger ends of the inner sleeve 54 and bear against the opposite ends of the outer sleeve 53.

Located in the longitudinal split or slot in the inner sleeve 54 is a wedge piece 59, the walls of said slot being beveled to complement the beveled sides of the wedge piece. A screw 60 passes through a stationary part of the carriage casting and through the outer sleeve 53 and is threaded at its inner end in this wedge piece. When it is desired to adjust this bearing to take up wear the screw 60 is turned slightly to tighten the wedge piece 59 in its slot sufficiently to insure contact between the sleeves 53, 54. The nut 75 is now turned to withdraw it from the end of the sleeve 53 and the nut 58 is then turned up to longitudinally move and compress the inner bearing sleeve 54 until it fits tightly. Finally, the screw 60 is turned to tighten the wedge piece 59 in this slot and rigidly lock the inner sleeve 54 against the outer sleeve 53.

Wear on the bearing sleeve 52 may be taken up by turning the nut 57 to force said sleeve longitudinally inward. At the same time the spindle 23 is drawn endwise to bring the shoulder 55 up tight against the hardened washer 56 and thereby take up any longitudinal play of the spindle. The nut 57 may be locked to the spindle 23 by a set screw not shown.

The means herein shown for starting and stopping rotation of the spindle 23 comprises a unitary clutch and brake collar 61 having external cone faces to complement internal cone faces formed respectively on the pulley 46 and on the stationary bearing sleeve 53. This collar 61 is splined on the spindle 23 so as to be slidable longitudinally but non-rotatable on the spindle. When the collar engages the pulley 46 the spindle will be rotated and when it engages the bearing 53 braking action will follow to stop the spindle quickly. An annular plate 62 is fixed on the spindle and a plurality of spring pressed plungers 63 are carried by the collar 61 and bear against the plate 62, thereby tending to move the collar into and hold it in engagement with the pulley 46.

The collar is arranged to be manually shifted by means of a yoke 64 having pivoted blocks 65 entering a groove in the collar, said yoke being mounted for oscillation upon journals 66, 67, which are supported in the carriage casting. The yoke is keyed to the journal 67 and on the outer end of this journal is fixed a hand-lever 68 which is located outside of the carriage housing in convenient reach of the operator. On the lower end of the yoke is a wedge pin 69 engaging a similar spring pressed pin 70 which is stationarily mounted, these two cooperating pins yieldingly holding the lever 68 and the clutch collar 61 in either of their operative positions.

The work may be secured in any suitable form of chuck or fixture. Herein I have shown two forms of chuck, one being a three-jaw chuck seen in Fig. 3, and the other a collet type of chuck shown in Fig. 4. A collar 75 threaded on the bearing sleeve 54 has a flange entering an annular groove in the hub of the chuck to protect the inner parts from splashing coolant or other foreign substance. The coolant is supplied through a pipe 76 that passes through the tubular spindle 23, the outer end of said pipe being carried in a bracket 77 mounted on the body section 16 of the carriage.

Referring to Fig. 4, the collet chuck which is herein shown by way of example, comprises the outer housing section 72 which is mounted directly on the end of the spindle 23 and the inner section 72$^a$ which is slotted at a plurality of points to form yielding jaws, said outer and inner sections having beveled or conical cooperating faces 78 by which the jaws on the inner section are caused to clamp or release a piece of work A when the inner section is moved in an axial direction with relation to the outer section. Any common or preferred construction of collet chuck may be employed, the one herein disclosed being merely representative.

The means for moving the inner chuck section axially comprises a draw bar 79 which preferably has a sleeve 80 at one end fitting within the end of the spindle 23 and suitably connected to said inner chuck section either by threading the sleeve exteriorly upon a projecting hub on the chuck section or by engaging the exteriorly threaded end of the sleeve in a socket in the chuck section, the latter method being shown by way of example in the drawings. The remainder of said draw bar comprises two bars 81 extending from diametrically opposite points on the sleeve 80 and fitting flush within channels 82 in the interior of the spindle 23. Bushings 83 fit upon the coolant pipe 76 and within the spindle 23 and drawbar 79.

The ends of the bars 81 remote from the chuck are rotatably secured within the hub of a hand wheel 84 which is located outside of the carriage housing, said hub being threaded upon the projecting end of the spindle 23 and fitting into a recess in the nut 57. The connection between the bars 81 and wheel 84 in the present instance comprises a pair of collars 85 surrounding the coolant pipe 76 and between which the ends of the bars 81 are secured, a nut 86 holding said collars rotatably within the hub of the hand wheel 84.

When a piece of work A is to be placed in or removed from the chuck the hand wheel 84 is manually rotated to cause it to travel along the threads on the spindle 23 and in this traveling movement of the wheel the draw bar 79 as a whole will be moved longitudinally in the direction to release or clamp the jaws of the chuck.

By dividing the major portion of the draw bar 79 into two spaced bars and locating these bars in channels within the spindle 23 I am enabled to obtain compactness in the parts of the spindle unit, keeping the thickness of the various parts at a minimum without sacrificing strength or operative advantages.

I claim as my invention:

1. A machine of the character described having, in combination, a base, a carriage mounted thereon and comprising a base section mounted to slide on ways on said base and a body section mounted on said base section for rotary adjustment about a vertical axis, a spindle mounted in the upper part of said body section, a motor mounted on the underside of said body section, and a driving connection between said motor and said spindle.

2. A machine of the character described having, in combination, a base, a carriage mounted on said base and having a rotary spindle, said carriage comprising a base section mounted to slide on ways on said base and a body section mounted on said base section for rotary adjustment about a vertical axis and extending downwardly through said base section into said machine base, and adjustable means mounted on the under side of said body section for selectively driving said spindle at different speeds.

3. A machine tool having, in combination, a carriage comprising two sections, one of which is mounted to slide and the other of which is mounted on the first section to rotate on a vertical axis, a spindle mounted in the rotatable section and having a pulley thereon, a motor and a pulley driven thereby mounted on the under side of said rotatable section, and a belt extending up through said rotatable section and running over both of said pulleys, whereby the motor, belt, and pulleys turn as a unit with said rotatable section to prevent twisting of said belt.

4. A machine of the character described having, in combination, a base, a carriage slidably mounted thereon, a spindle on said carriage and means for driving said spindle comprising change speed gearing mounted on the underside of said carriage and operatively connected to said spindle, and a motor mounted on said carriage beneath said gearing and operatively connected thereto, said gearing and motor forming a part of and traveling with said carriage.

5. A machine of the character described having, in combination, a base having ways, a carriage having guides slidably supported by said ways, a spindle on said carriage, and means for driving said spindle comprising a motor and change speed gearing mounted on the underside of said carriage in a plane beneath said ways.

6. A grinding machine having, in combination, a base, a carriage slidably mounted on said base, a spindle mounted in said carriage, change speed mechanism secured to the under side of said carriage and operatively connected with said spindle, and a motor mounted on the under side of said change speed mechanism and operatively connected with the latter.

7. A grinding machine having, in combination, a base, a carriage mounted thereon and having a rotary spindle, said carriage comprising a sliding section and a rotatable section, said rotatable section extending downwardly into said base, a change speed mechanism mounted on the under side of said rotatable section and operatively connected with said spindle, and a motor mounted on the under side of said change speed mechanism and operatively connected to the latter.

8. A grinding machine having, in combination, a base, a carriage comprising two sections one of which is slidably mounted on said base and the other of which is rotatably adjustable on the first section on a vertical axis, and a rotary spindle and driving motor therefor mounted respectively at the upper and lower ends of the latter section and operatively connected together.

9. A grinding machine having, in combination, a base, a carriage comprising two sections, one of which is slidably mounted on said base and the other of which is rotatably adjustable on said slidable section, said rotatable section extending downwardly through said slidable section, a rotary spindle mounted in said rotatable section, and variable speed driving means mounted on the under side of said rotatable section.

10. A grinding machine comprising a two-section carriage, one of which sections is mounted to slide, the other section being mounted on the first section to rotate on a vertical axis, a spindle carried by the latter section, and means for rotatably adjusting said latter section comprising a worm gear thereon and a worm mounted on the first section and meshing with said worm gear.

11. A grinding machine having, in combination, a two section carriage, one section being mounted to slide and the other section being mounted on said sliding section to rotate on a vertical axis, a spindle carried by the latter section, a motor carried on the under side of said last mentioned section, and operatively connected with said spindle, a worm tooth sector formed on the periphery of said rotatable section, and a worm mounted on said first section and meshing with said sector to rotatably adjust said last mentioned section.

12. A grinding machine having, in combination, a carriage provided with a rotary spindle, a pulley loosely mounted on said spindle, a motor on the under side of said carriage and operatively connected to said pulley, a stationary braking bearing on said carriage, a combined clutch and brake element splined for longitudinal movement on said spindle, spring means normally tending to hold said element in either extreme position, and means for selectively moving said member into engagement with said pulley or said braking bearing.

13. A grinding machine having, in combination, a carriage provided with a rotary spindle, a driver rotatably mounted on said spindle, a motor on the carriage and operatively connected to said driver, and a combined clutch and brake element slidably but non-rotatably mounted on said spindle, and arranged to move into engagement with said driver to drive the spindle or into engagement with a stationary part on the carriage to brake said spindle.

14. A machine tool having, in combination, a spindle, a support for said spindle rotatably adjustable about an axis perpendicular thereto, a motor and change speed gearing mounted on the under side of said support and operatively connected to said spindle to drive the latter, and means for shifting said change speed gearing and operable from the exterior of the machine tool in any position of rotatable adjustment of said support.

15. A machine tool having, in combination, a spindle, a support for said spindle rotatably adjustable about an axis perpendicular thereto, a motor and change speed gearing mounted on the under side of said support and operatively connected to said spindle to drive the latter, and means for shifting said change speed gearing mounted on said support to rotate therewith, said motor, gearing and shifting means being unitary with said support.

In testimony whereof, I have hereunto affixed my signature.

PRENTICE CONRADSON.